United States Patent
Iyengar

(10) Patent No.: US 10,437,719 B2
(45) Date of Patent: *Oct. 8, 2019

(54) INTELLIGENT COMPUTER MEMORY MANAGEMENT BASED ON REQUEST SIZES

(71) Applicant: International Business Machines Corporation, Armonk, NY (US)

(72) Inventor: Arun Iyengar, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/030,954

(22) Filed: Jul. 10, 2018

(65) Prior Publication Data

US 2018/0314628 A1 Nov. 1, 2018

Related U.S. Application Data

(60) Continuation of application No. 15/343,336, filed on Nov. 4, 2016, now Pat. No. 10,108,541, which is a (Continued)

(51) Int. Cl.
| | |
|---|---|
| *G06F 12/00* | (2006.01) |
| *G06F 13/00* | (2006.01) |
| *G06F 13/28* | (2006.01) |
| *G06F 12/02* | (2006.01) |
| *G06F 9/50* | (2006.01) |

(Continued)

(52) U.S. Cl.
CPC .......... *G06F 12/0238* (2013.01); *G06F 3/061* (2013.01); *G06F 3/0604* (2013.01);
(Continued)

(58) Field of Classification Search
CPC .. G06F 11/3037; G06F 12/02; G06F 12/0871; G06F 2212/6042
(Continued)

(56) References Cited

U.S. PATENT DOCUMENTS

| | | |
|---|---|---|
| 5,598,562 A | 1/1997 | Cutler et al. |
| 5,668,998 A | 9/1997 | Mason et al. |

(Continued)

OTHER PUBLICATIONS

Non-Final Office Action for U.S. Appl. No. 12/887,964 dated Mar. 29, 2013.
(Continued)

*Primary Examiner* — Edward J Dudek, Jr.
*Assistant Examiner* — Sidney Li
(74) *Attorney, Agent, or Firm* — Fleit Gibbons Gutman Bongini Gianco PL; Jose Gutman

(57) ABSTRACT

A method, system, and computer readable storage medium for managing computer memory by an intelligent memory manager. The intelligent memory manager performs a method including: deploying a plurality of memory allocators each customizable to efficiently handle a set of different memory request size distributions in support of at least one application; determining a monetary fee to charge a user based on consumption of memory resources; and determining a frequency of backing up a main memory object in a persistent storage based on a bandwidth consumed by storing the main memory object in the persistent storage.

20 Claims, 8 Drawing Sheets

Related U.S. Application Data division of application No. 14/924,813, filed on Oct. 28, 2015, now Pat. No. 9,519,426, which is a division of application No. 13/612,238, filed on Sep. 12, 2012, now Pat. No. 9,207,985, which is a continuation of application No. 12/887,964, filed on Sep. 22, 2010, now Pat. No. 8,806,158.

(51) Int. Cl.
*G06F 3/06* (2006.01)
*G06F 11/30* (2006.01)
*G06F 12/0871* (2016.01)

(52) U.S. Cl.
CPC .......... *G06F 3/0631* (2013.01); *G06F 3/0632* (2013.01); *G06F 3/0653* (2013.01); *G06F 3/0673* (2013.01); *G06F 3/0683* (2013.01); *G06F 9/5016* (2013.01); *G06F 12/02* (2013.01); *G06F 12/023* (2013.01); *G06F 11/3037* (2013.01); *G06F 12/0871* (2013.01); *G06F 2212/1016* (2013.01); *G06F 2212/1041* (2013.01); *G06F 2212/6042* (2013.01)

(58) Field of Classification Search
USPC ........................................................ 711/171
See application file for complete search history.

(56) References Cited

U.S. PATENT DOCUMENTS

| | | | |
|---|---|---|---|
| 5,771,379 A | 6/1998 | Gore, Jr. | |
| 5,802,572 A | 9/1998 | Patel et al. | |
| 6,012,032 A * | 1/2000 | Donovan | G06Q 20/102 705/40 |
| 6,490,670 B1 | 12/2002 | Collins et al. | |
| 6,766,457 B1 | 7/2004 | Baisley | |
| 6,994,694 B2 | 2/2006 | Muthukkaruppan | |
| 2003/0028740 A1 * | 2/2003 | Challenger | G06F 12/023 711/170 |
| 2003/0043638 A1 | 3/2003 | Chrisop et al. | |
| 2003/0065708 A1 | 4/2003 | Jacobs et al. | |
| 2003/0126355 A1 | 7/2003 | David | |
| 2004/0139127 A1 | 7/2004 | Pofelski | |
| 2005/0273568 A1 * | 12/2005 | Blandy | G06F 12/023 711/170 |
| 2006/0112254 A1 | 5/2006 | Piper et al. | |
| 2007/0143220 A1 | 6/2007 | Ajiro | |
| 2007/0156997 A1 | 7/2007 | Boule et al. | |
| 2010/0005222 A1 | 1/2010 | Brant et al. | |
| 2010/0094653 A1 * | 4/2010 | Tribble | G06F 19/326 705/3 |
| 2014/0143889 A1 | 5/2014 | Ginter et al. | |

OTHER PUBLICATIONS

Non-Final Office Action for U.S. Appl. No. 12/887,964 dated Dec. 19, 2012.
Non-Final Office Action for U.S. Appl. No. 15/343,437 dated Feb. 16, 2018.
Final Office Action for U.S. Appl. No. 15/343,336 dated Feb. 28, 2018.

* cited by examiner

INTELLIGENT COMPUTER MEMORY MANAGEMENT BASED ON REQUEST SIZES

FIELD OF THE INVENTION

The present invention generally relates to computer memory, and more particularly relates to managing computer memory.

BACKGROUND OF THE INVENTION

Dynamic memory allocation is generally used for managing memory dynamically at run time. Dynamic memory allocation can be used for allocating space for objects whose sizes and lifetimes are not known statically (i.e. at compile time). Unfortunately, dynamic memory allocators incur both execution time overhead and space overhead. Within some object oriented computer languages such as C and C++, dynamic memory allocation is achieved by functions such as malloc and free. However, such functions are not always sufficient. For example, the performance of these types of functions might not be sufficient for a particular application. Also, these types of functions generally do not provide garbage collection or persistent storage allocation in non-volatile memory (e.g. disk storage).

SUMMARY OF THE INVENTION

In one embodiment, a system for managing computer memory, the system comprising: a processor; a memory communicatively coupled to the processor; and an intelligent memory manager communicatively coupled to the processor and the memory, the intelligent memory manager for performing a method comprising: deploying a plurality of memory allocators each customizable to efficiently handle a set of different memory request size distributions in support of at least one application, the deploying improving at least one of performance and memory utilization of the computing system; determining a monetary fee to charge a user based on consumption of memory resources; and determining a frequency of backing up a main memory object in a persistent storage based on a bandwidth consumed by storing the main memory object in the persistent storage.

In another embodiment, a method for managing computer memory is disclosed. The method comprises initializing a plurality of memory allocators within a computing system. At least a first memory allocator and a second memory allocator in the plurality of memory allocators are each customizable to efficiently handle a set of different memory request size distributions. The first memory allocator is configured to handle a first memory request size distribution. The second memory allocator is configured to handle a second memory request size distribution. The second memory request size distribution is different than the first memory request size distribution. At least the first memory allocator and the second memory allocator that have been configured are deployed within the computing system in support of at least one application. Deploying at least the first memory allocator and the second memory allocator within the computing system improves at least one of performance and memory utilization of the at least one application.

In another embodiment, another method for managing computer memory is disclosed. The method comprises initializing a memory allocator in a computing system. The memory allocator allocates a plurality of main memory objects. At least one main memory object in the plurality of main memory objects is backed up in persistent storage utilizing a backup operation. Input-output bandwidth being consumed for storing information in the persistent storage is monitored. The backup operation is modified based on monitoring the bandwidth being consumed.

In yet another embodiment, a method for managing computer memory is disclosed. The method comprises initializing at least one memory allocator within a computing system. The at least one memory allocator is deployed on a multi-user system where users are charged a monetary fee based on consumption of resources thereby. A consumption of at least one of a set of memory resources and a set of persistent storage resources by a user is determined by the memory allocator. A cost associated with the consumption that has been determined is determined by the memory allocator. A monetary fee to charge the user is determined based on the cost that has been determined.

In yet another embodiment, a method for managing computer memory is disclosed. The method comprises initializing, which a computing system, a memory allocator. The memory allocator utilizes at least one memory allocation method to allocate memory for the computing system. A set of memory requests made by the computing system is monitored. The at least one memory allocation method utilized by the memory allocator is dynamically modified in response to the set of memory requests that has been monitored. This improves at least one of performance and memory utilization of the at least one application.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, various detailed embodiments of the present invention are disclosed herein; however, it is to be understood that various disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
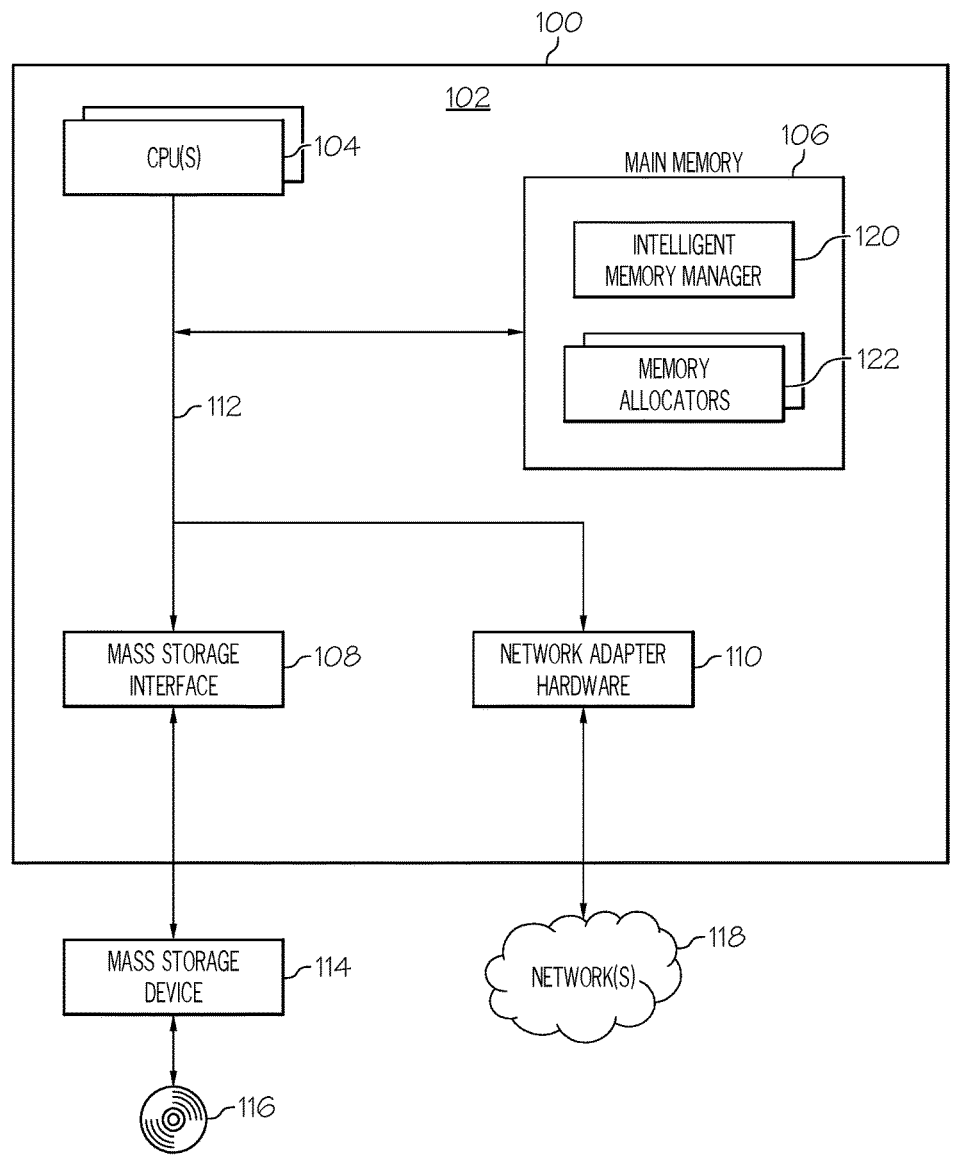
FIG. 1 is a block diagram illustrating one example of an operating environment according to one embodiment of the present invention.

FIG. 1 shows an exemplary operating environment applicable to various embodiments of the present invention. In particular, FIG. 1 shows an information processing system 100 that is based upon a suitably configured processing system adapted to implement one or more embodiments of the present invention. Similarly, any suitably configured processing system can be used as the information processing system 100 by various embodiments of the present invention. The system 100 can be a standalone system or reside within a multi-system environment such as a parallel-distributing environment.

The information processing system 100 includes a computer 102. The computer 102 has a processor(s) 104 that is connected to a main memory 106, a mass storage interface 108, and network adapter hardware 110. A system bus 112 interconnects these system components. The main memory 106, in one embodiment, comprises an intelligent memory manager 120 and one or more memory allocators 122, which are discussed in greater detail below. Although illustrated as concurrently resident in the main memory 106, it is clear that respective components of the main memory 106 are not required to be completely resident in the main memory 3106 at all times or even at the same time. In one embodiment, the information processing system 100 utilizes conventional virtual addressing mechanisms to allow programs to behave as if they have access to a large, single storage entity, referred to herein as a computer system memory, instead of access to multiple, smaller storage entities such as the main memory 106 and mass storage device 114. Note that the term "computer system memory" is used herein to generically refer to the entire virtual memory of the information processing system 100.

The mass storage interface 110 is used to connect mass storage devices, such as mass storage device 116, to the information processing system 100. One specific type of data storage device is an optical drive such as a CD/DVD drive, which may be used to store data to and read data from a computer readable medium or storage product such as (but not limited to) a CD/DVD 116. Another type of data storage device is a data storage device configured to support, for example, NTFS type file system operations.

Although only one CPU 104 is illustrated for computer 102, computer systems with multiple CPUs can be used equally effectively. Various embodiments of the present invention further incorporate interfaces that each includes separate, fully programmed microprocessors that are used to off-load processing from the CPU 104. An operating system (not shown) included in the main memory is a suitable multitasking operating system such as any of the Linux, UNIX, Windows, and Windows Server based operating systems. Various embodiments of the present invention are able to use any other suitable operating system. Some embodiments of the present invention utilize architectures, such as an object oriented framework mechanism, that allows instructions of the components of operating system (not shown) to be executed on any processor located within the information processing system 100. The network adapter hardware 110 is used to provide an interface to a network 118. Various embodiments of the present invention are able to be adapted to work with any data communications connections including present day analog and/or digital techniques or via a future networking mechanism.

Various embodiments of the present invention provide customized memory allocation that can be tailored to individual applications via the IMM 120. The IMM 120 provides a variety of memory allocation configurations including, but not limited to, first fit, best fit, multiple free list fit I, multiple free list fit II, quick fit, and buddy systems. See, for example, "Scalability of Dynamic Storage Allocation Algorithms", Arun Iyengar, Proceedings of Frontiers '96, herein incorporated by reference in its entirety. Therefore, if an application has very specific memory allocation requirements, the IMM 120 can handle it efficiently.

Figure 2:
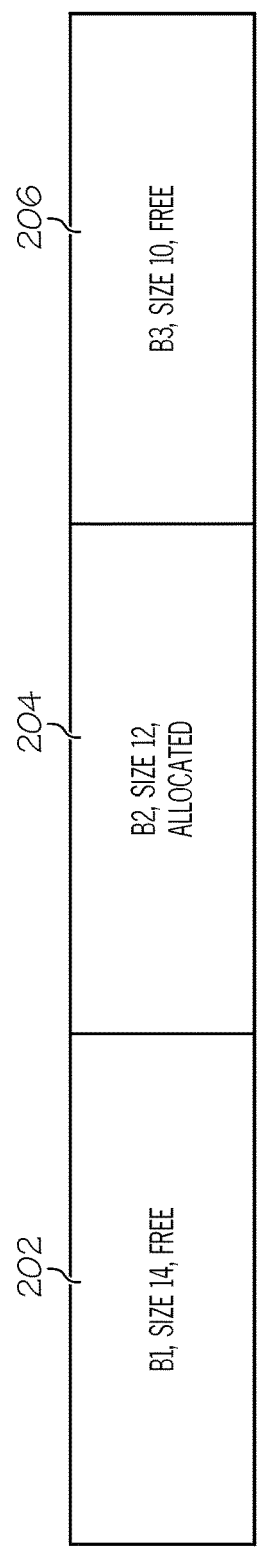
FIG. 2 shows one example of external fragmentation with respect to computer memory.

Memory allocators should make efficient use of memory. However, conventional memory allocators typically waste memory due to internal and external fragmentation. Internal fragmentation occurs when a request is satisfied by a larger block than is necessary. For example, if a request for a block of 17 bytes is satisfied by a block of 32 bytes, 15 bytes are wasted due to internal fragmentation. External fragmentation occurs when memory is wasted due to allocated blocks being interspersed with free blocks. For example, in FIG. 2, the system cannot satisfy a request larger than 14, even though 24 bytes are free. This is because the 24 bytes are not contiguous. For example, FIG. 2 shows that a first block 202 comprises 14 free bytes, a second block 204 comprises 12 allocated bytes, and a third block 206 comprises 10 free bytes. As can be seen, the first and third blocks 202, 206 are not contiguous.

Figure 3:
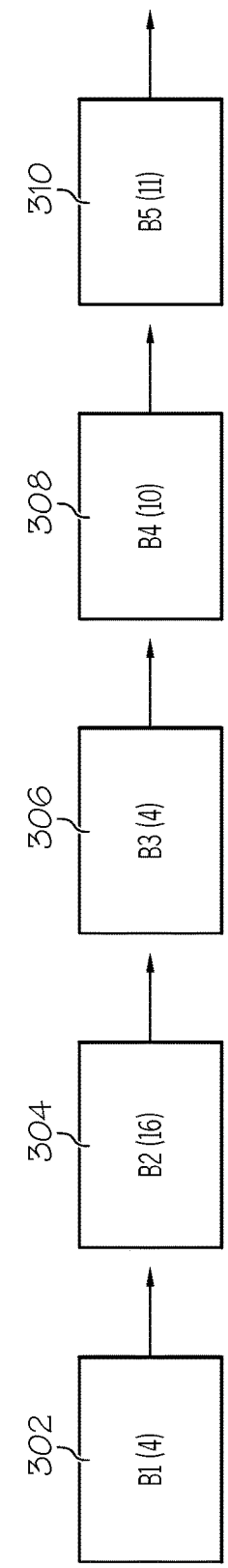
FIG. 3 shows one example of a memory blocks for illustrating a first fit memory allocation technique according to one embodiment of the present invention.

Multiple methods for allocating memory can be used by the IMM 120. One example is a first fit technique. Another example is best fit technique. In a first fit system, the first block found that is large enough to satisfy the request is used. For example, in FIG. 3 shows a plurality of blocks 302, 304, 306, 308, 310 each comprises a given number of bytes shown in parenthesis. A first fit search of the list for a block of size 9 returns block B2 304. In a best fit system, a smallest block large enough to satisfy the request is used. Therefore, using the example shown in FIG. 2 a best fit search returns block B4 308. First fit has the advantage of generally being faster. Best fit has the advantage of generally wasting less memory. Best fit usually results in better memory utilization even in situations in which the memory allocator splits allocated blocks to minimize internal fragmentation.

Figure 4:
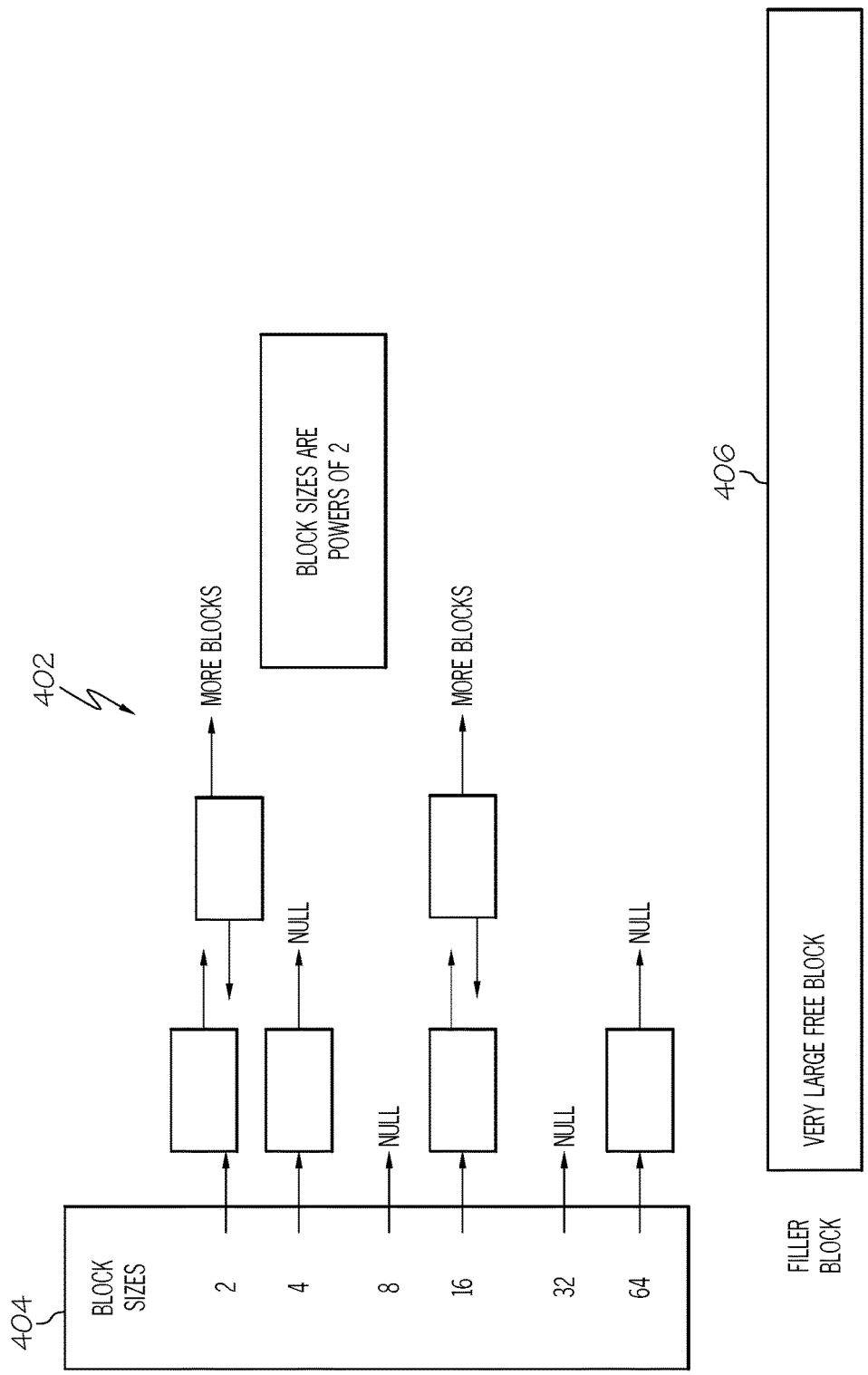
FIG. 4 illustrates a binary buddy system for use with one memory allocation technique according to one embodiment of the present invention.
Figure 5:
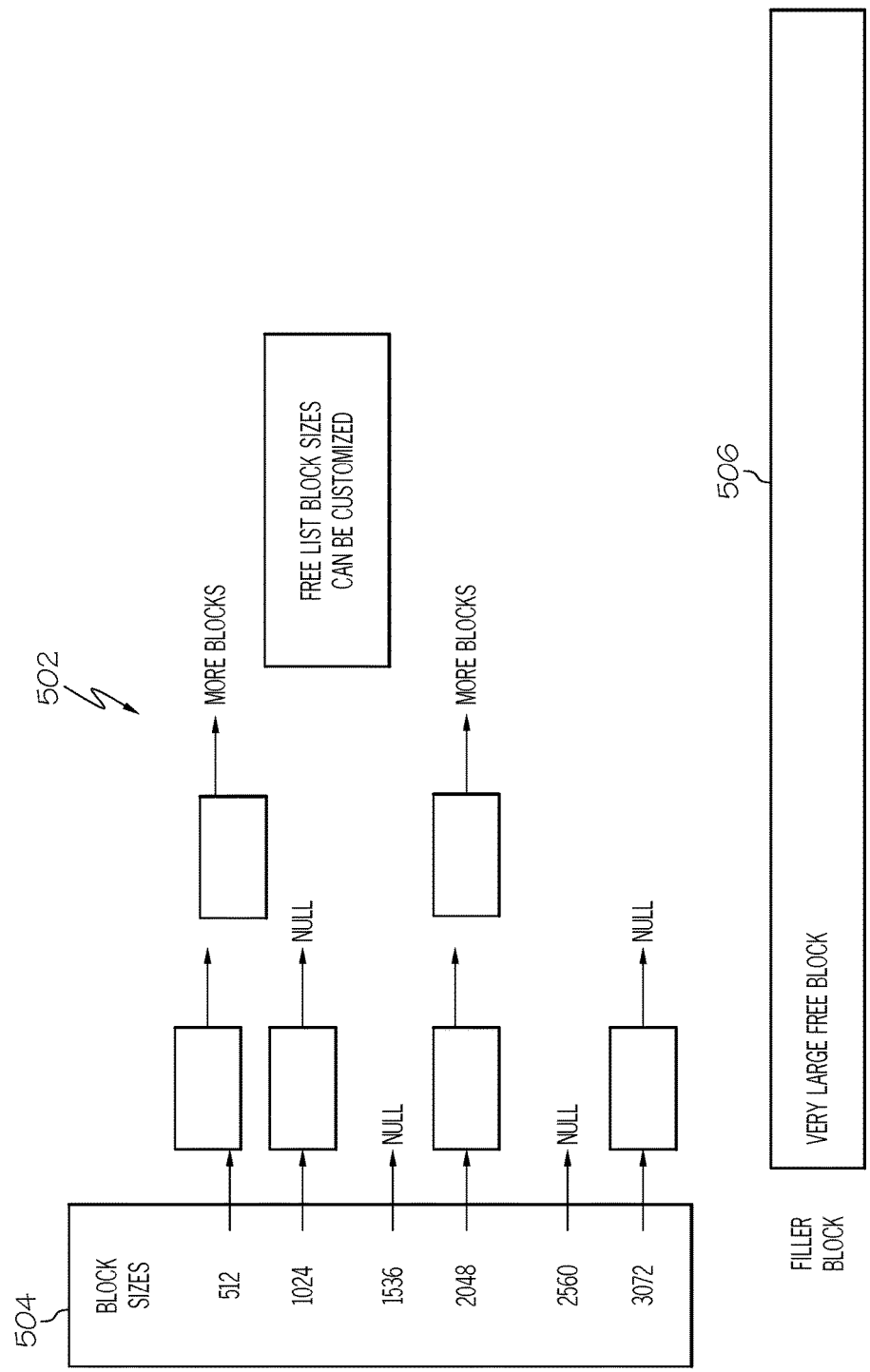
FIG. 5 illustrates a quick fit system for use with one memory allocation technique according to one embodiment of the present invention.

Another possible memory allocation system that the IMM 120 can use is a buddy system. FIG. 4 illustrates a binary buddy system. In a buddy system memory is split in half to try and obtain a best fit. For example, FIG. 4 shows a plurality of blocks 402 each with a block size that is a power of 2, as shown by box 404. In other words, memory is allocated in powers of 2. When a free list block does not exist a filler block 406 can be used to satisfy the memory request. Yet another memory allocation system that the IMM 120 can use is quick fit. In a quick fit system (such as the one shown in FIG. 5), separate free lists (a free list is a list containing free blocks 502) known as quick lists exist for free blocks, which is a multiple of a grain size (up to a maximum size; the grain size in FIG. 5 is 512 as shown in box 504). This results in fast allocation for block sizes corresponding to quick lists.

FIG. 5 also shows a filler block 506 (sometimes referred to as a tail). When quick fit is used, all of the quick lists are initially empty. If a quick list for a block of size n is empty, the block of size n is obtained from the filler block. The filler block then decreases in size by n. Allocation from the filler block is fast. After the block is de-allocated, it is stored on the appropriate quick list. This is the manner by which quick lists become populated.

Figure 6:
FIG. 6 illustrates a filler block for use with one memory allocation technique according to one embodiment of the present invention.

A very fast memory allocation embodiment is shown in FIG. 6. In this memory allocation embodiment, memory is simply allocated from the filler block 602 and is never de-allocated. While this approach is fast, it runs out of memory quickly for applications that perform many allocations. For applications that run out of memory using this approach, one of the earlier schemes that wastes less memory is more beneficial. It should be noted that a wide variety of other memory allocation methods can be used by one or more embodiments of the present invention.

One advantage of various embodiments of the present invention is that memory allocation methods can be tailored to the needs of specific applications. For example, if an application makes a high percentage of memory allocation requests for blocks of sizes 90,901; 2,007; 255,345; and 9,567,891, special free lists can be allocated specifically for these sizes. In general, it may not be advisable to have special free lists for those particular sizes because an application would be unlikely to request many blocks of those sizes. If the application is known to request many blocks corresponding to these sizes, then the IMM 120 provides a memory allocator 122 with free lists specifically for blocks of these sizes for that application. For other applications, the IMM 120 utilizes different allocation configurations without free lists specifically for the sizes 90,901; 2,007; 255,345; and 9,567,891. This illustrates how the IMM 120 can provide specific memory allocation methods for particular applications.

Another advantage of various embodiments of the present invention is that they allow multiple memory allocators, $m_1$, $m_2$, $m_3$, . . . , $m_n$, to operate either in parallel or at separate times. The use of multiple memory allocators 122 allows different memory mangers to be tailored to different application needs. For example, the system 100 might have an application that almost never requests blocks of size larger than 20. In this case, a memory allocator $m_1$ optimized for allocating small blocks is appropriate. Another application might have a high percentage of requests for blocks larger than size 1000. A different memory allocator $m_2$ might be appropriate for this type of application. If the applications are running concurrently on the same system, having $m_1$ and $m_2$ executing concurrently is important. It can also be the case that a single application might execute more efficiently if it uses multiple memory allocators to handle different allocation needs that it may have. Thus, the ability to use multiple memory allocators is advantageous.

Programmers have the ability to customize memory allocation in several ways. These include, but are not limited to the following: (1) picking an implementation of a particular memory allocation algorithm, such as first fit, best fit, multiple free list fit I, multiple free list fit II, quick fit, a buddy system, etc; (2) tailoring free list allocations to certain request sizes. For example, it was discussed above how free lists for specific block sizes could be used in a memory allocator; and (3) using multiple memory allocators concurrently, each tailored to different memory allocation needs.

In addition, the IMM 120 has the ability to monitor memory allocation and de-allocation requests from executing programs and determine request patterns. Based on the request patterns, the IMM 120 can select an appropriate memory allocation configuration. For example, if the IMM 120 determines that a program is requesting block sizes that are powers of 2, it can use a binary buddy system for that program. If the IMM 120 determines that almost all request sizes are less than or equal to 30, it can use a quick fit system with quick lists for blocks up to size 30.

One advantage of having the IMM 120 monitor requests and select appropriate memory allocation methods based on the requests is that the user does not have to make the choices. The IMM 120 can make the choice of an appropriate memory manager automatically. This makes the programmer/user's job easier. It can also allow the IMM 120 to make intelligent choices about memory management at run time based on information that the user might not have. This can lead to better performance than is otherwise be possible.

The use of multiple memory managers also allows all memory objects corresponding to a memory manager to be de-allocated at once. Users have the ability to de-allocate all memory objects belonging to a particular memory manager, $m_1$, in a single command. This provides some degree of garbage collection. A programmer can allocate a set of objects in a memory manager $m_1$. At a later point, the programmer can request that all memory objects in m1 be de-allocated.

By contrast, in programming languages such as C and C++ in which memory is allocated dynamically using malloc and de-allocated using free, there is no easy way to de-allocate a group of dynamically allocated objects at once. Instead, programmers typically keep track of individual objects. When it is time to de-allocate a particular object $o_1$, $o_1$ is explicitly de-allocated by a call to free. Programmers explicitly de-allocate each object by calls to free. If a programmer mistakenly de-allocates an object which should not have been de-allocated, this can cause the program to function incorrectly. If, on the other hand, a programmer fails to free objects that should be de-allocated, this can lead to memory leaks in which the program consumes more memory than it should. If the memory leak problem is serious, this can greatly decrease the performance of the system and even cause it to cease to function effectively. Therefore, there is a need for one or more embodiments of the present invention that provides more powerful methods of de-allocating multiple objects.

Another advantage of the IMM 120 is that it provides flexible options for backing up main memory objects in persistent storage. Persistent storage is important for keeping data around for long periods of time. Data in persistent storage continues to exist after a program stops executing (or crashes), for example. File systems and database management systems (DBMS) are two examples of persistent storage. This aspect also distinguishes one or more embodiments of the present invention from dynamic memory management via malloc and free. Malloc and free do not provide capabilities for backing up main memory objects in persistent storage. Instead, programmers are responsible for writing their own code to back up main memory objects in persistent storage.

With respect to backing up memory objects on disk, there is a trade-off between performance and level of consistency of copies of objects. If objects are backed up on disk frequently, this improves consistency. However, it also has higher overhead that can adversely affect performance. If objects are backed up on disk less frequently, this introduces less overhead that can improve performance.

The options provided by the IMM 120 for backing up memory objects in persistent storage include, but are not limited to (1) store object $o_1$ in persistent storage whenever $o_1$ changes (e.g., a value associated with $o_1$ changes); (2) store object $o_1$ in persistent storage whenever the version of $o_1$ in persistent storage has been obsolete for a time period exceeding a threshold; and (3) store object $o_1$ on disk whenever the number of updates to $o_1$ since the last version of $o_1$ stored in persistent storage exceeds a threshold.

The IMM 120 provides is dynamic adjustment of how memory objects are backed up in persistent storage in response to run-time conditions. When there is sufficient I/O bandwidth between main memory and persistent storage that is not being used, the IMM 120 can back up memory objects more frequently. When the I/O channels between main memory and disk are heavily used and on the verge of becoming a bottleneck, the IMM 120 reduces the frequency by which memory objects are backed up in persistent storage. Since the IMM 120 can monitor I/O usage and make decisions dynamically based on spare I/O capacity, this simplifies the programmer's job and allows the system to achieve an optimal balance between performance and level of consistency of objects backed up in persistent storage.

Using this feature, the IMM 120 often reduces the frequency with which objects are backed up in persistent storage in response to more I/O bandwidth being consumed for storing (and/or reading) data in persistent storage. Conversely, the IMM 120 often increases the frequency with which objects are backed up in persistent storage in response to less I/O bandwidth being consumed for storing (and/or reading) data in persistent storage. The IMM 120 also can monitor the amount of memory and persistent storage taken up by a user. The IMM 120 can provide a wide variety of statistics on memory and storage usage.

The IMM 120 also has features for environments in which the usage of memory (and/or persistent storage) for individual users needs to be carefully tracked and monitored. For example, in multi-user and/or cloud computing environments, there may be many users of a system. A given user may have constraints on how much memory he/she is allowed to use. In addition, the user might be billed for usage of the platform. A fair billing system would consider how much memory and/or persistent storage is being used to bill the customer. For these types of environments, the IMM 120 has the capability to restrict the amount of memory (or storage) a user requests. When the user reaches his/her quota, he/she cannot receive more memory/storage.

The IMM 120 also allows costs to be assigned to a user based on how the user uses memory (and/or persistent storage). The simplest cost calculation approach is to assign a cost that increases linearly with the amount of memory being consumed. However, other cost calculation methods are also provided. For example, during peak usage periods, higher costs can be assigned for memory utilization than during periods when the system is not being used as much. This can encourage people to use the system during less busy times. Another cost calculation method is to assign low costs if the user maintains memory (storage) usage below a certain threshold. After the user exceeds the threshold, costs rise considerably. Additionally factors can be taken into account for charging users. Memory (storage) utilization is only one factor. Input from the IMM 120 is one of several things that can affect the total amount that is billed to a user.

The IMM 120, in one embodiment, can be implemented in a programming language such as C++. In this embodiment, a class referred to as MemoryManager implements key functions for memory management. A memory allocator can be comprised of an object belonging to the MemoryManager class. Multiple memory allocators can be created by creating multiple MemoryManager objects. Many other implementations are possible within the spirit and scope of the invention. It should be noted that the IMM 120 can be implemented in other programming languages as well.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments of the present invention are described below with reference to flowchart illustrations and/or block diagrams of methods, apparatus (systems) and computer program products according to one or more embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
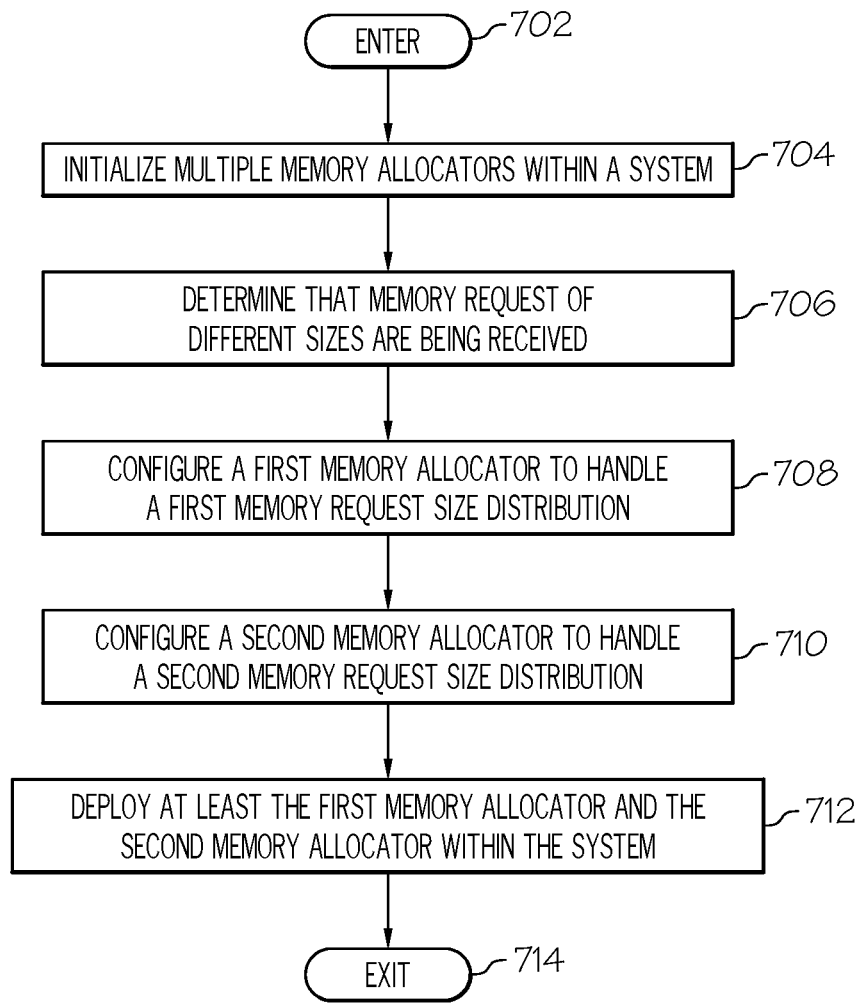
FIGS. 7-9 are operational flow diagrams illustrating various processes for managing computer memory according to one embodiment of the present invention.
Figure 8:
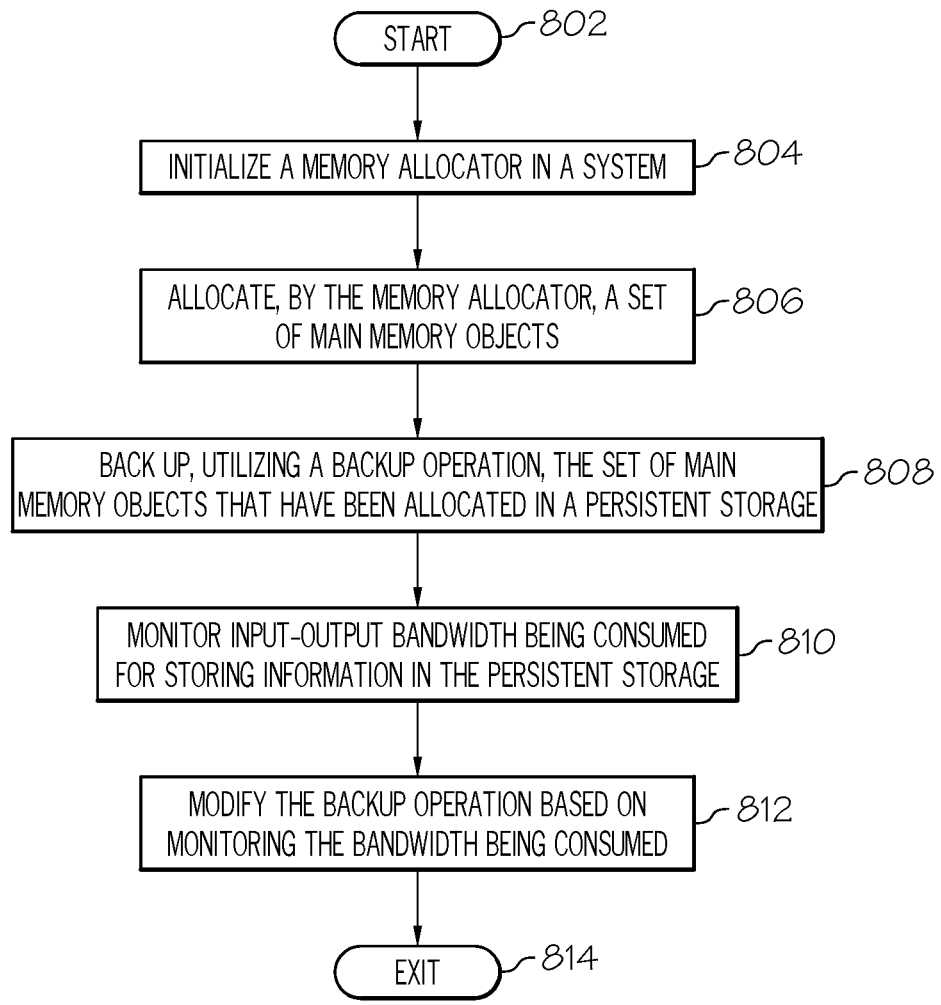
Figure 9:
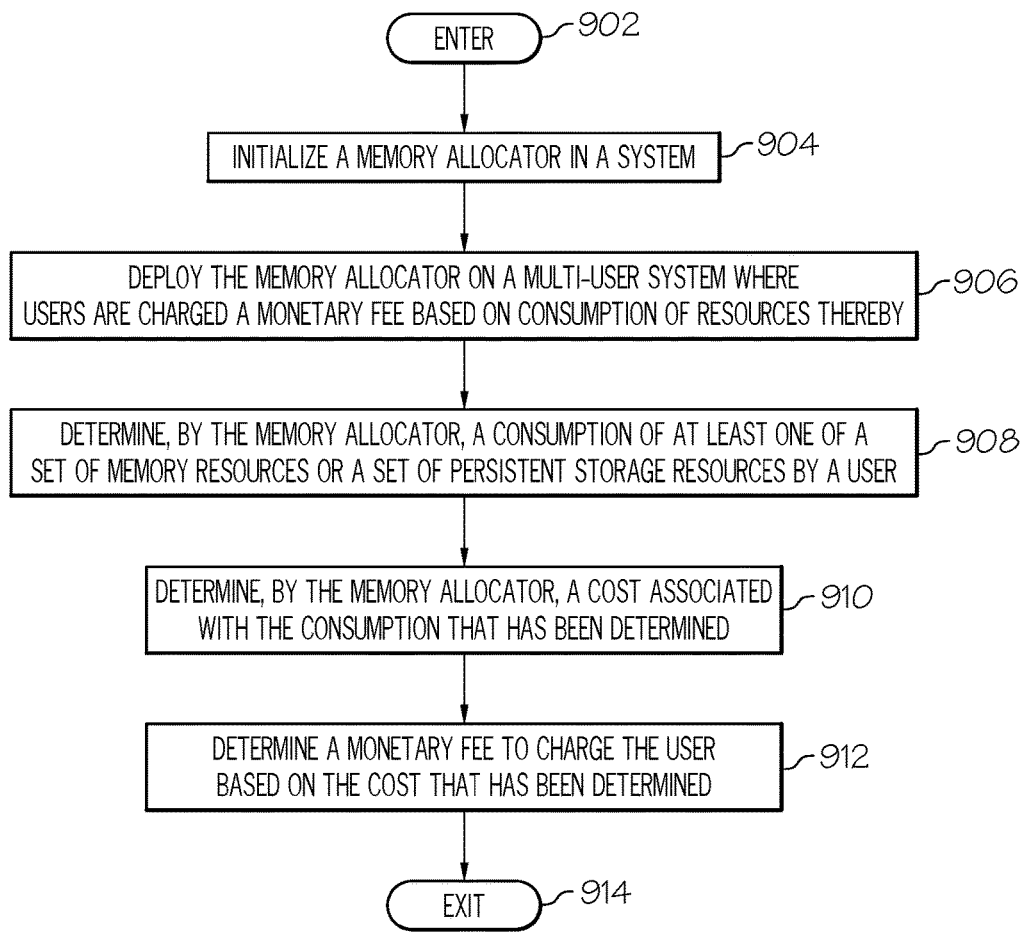

Referring now to FIGS. 7-9, the flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 7 is an operational flow diagram illustrating one example of managing computer memory, as discussed above. The operational flow of FIG. 7 begins at step 702 and flows directly into step 704. The intelligent memory manager 120, at step 704, initializes multiple allocators 122 within a system 100. The intelligent memory manager 120, at step 706, determines that memory requests of different sizes are being received. The intelligent memory manager 120, at step 708, configures a first memory allocator to handle a first memory request size distribution based on memory requests of different sizes are being received. The intelligent memory manager 120, at step 710, configures a second memory allocator to handle a second memory request size distribution based on memory requests of different sizes are being received. The intelligent memory manager 120, at step 712, deploys at least the first memory allocator and the second memory allocator within the system. The control flow then exits at step 714.

FIG. 8 is an operational flow diagram illustrating another example of managing computer memory, as discussed above. The operational flow of FIG. 8 begins at step 802 and flows directly into step 804. The intelligent memory manager 120, at step 804, initializes a memory allocator 122 in a system 100. The memory allocator 122 is customizable to efficiently handle a set of different request size distributions. The memory allocator 122, at step 806, allocates a set of main memory objects. The intelligent memory manager 120, at step 806, backs up, utilizing a backup operation, the set of main memory objects that have been allocated in a persistent storage. The intelligent memory manager 120, at step 808, monitors input-output bandwidth being consumed for storing information in the persistent storage. The intelligent memory manager 120, at step 812, modifies the backup operation based on monitoring the bandwidth being consumed. The control flow then exits at step 814.

FIG. 9 is an operational flow diagram illustrating yet another example of managing computer memory, as discussed above. The operational flow of FIG. 9 begins at step 902 and flows directly into step 904. The intelligent memory manager 120, at step 904, initializes a memory allocator. The intelligent memory manager 120, at step 906, deploys the memory allocator on a multi-user system where users are charged a monetary fee based on consumption of resources thereby. The memory allocator 120, at step 908, determines a consumption of at least one of a set of memory resources or a set of persistent storage resources by a user. The memory allocator 135, at step 910, determines a cost associated with the consumption that has been determined. The intelligent memory manager 120, at step 912, determines a monetary fee to charge the user based on the cost that has been determined. The control flow then exits at step 914.

Although various embodiments of the invention have been disclosed, those having ordinary skill in the art will understand that changes can be made to the various embodiments without departing from the spirit and scope of the invention. The scope of the invention is not to be restricted, therefore, to the various embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method for managing computer memory, the method comprising:
    initializing a plurality of memory allocators within a computing system, wherein at least a first memory allocator and a second memory allocator in the plurality of memory allocators are each customizable with respective first type and second type of memory allocation methods, the first type being different from the second type, to efficiently handle a set of different memory request size distributions;
    configuring the first memory allocator to use the first type of memory allocation method to handle a first memory request size distribution;
    configuring the second memory allocator to use the second type of memory allocation method to handle a second memory request size distribution, the second memory request size distribution being different than the first memory request size distribution; and
    deploying at least the first memory allocator and the second memory allocator that have been configured within the computing system in support of at least one application, the deploying improving at least one of performance and memory utilization of the at least one application.

2. The method of claim 1, further comprising:
    storing a plurality of memory objects by at least one memory allocator in the plurality of memory allocators.

3. The method of claim 2, further comprising:
    determining that the plurality of memory objects that have been stored are no longer required; and
    de-allocating, in response to the determining, memory corresponding to the memory allocator.

4. The method of claim 1, further comprising:
    backing up a main memory object in a persistent storage.

5. The method of claim 4, wherein the backing up is performed after a value associated with the main memory object has changed.

6. The method of claim 4, wherein the backing up is performed in response to determining that a version of the main memory object stored within the persistent storage has been obsolete for a time period exceeding a threshold.

7. The method of claim 4, wherein the backing up is performed in response to a number of updates to the main memory object since a most recent version of the main memory object was stored in the persistent storage exceeding a given threshold.

8. The method of claim 4, wherein the persistent storage comprises one of a file system and database management system.

9. The method of claim 1, wherein at least one memory allocator in the plurality of memory allocators utilizes at least one of:
    a first fit memory management method;
    a best fit management method;
    a multiple free list fit I management method;
    a multiple free list fit II management method;
    a quick fit management method; and
    a buddy system management method.

10. The method of claim 1, wherein the customizing the first memory allocator is based on a plurality of memory allocation and deallocation requests from at least one program.

11. A system for managing computer memory, the system comprising:
    a processor;
    a memory communicatively coupled to the processor; and
    an intelligent memory manager communicatively coupled to the processor and the memory, the intelligent memory manager for performing a method comprising:
        deploying a plurality of memory allocators each customizable with a respective type of memory allocation method dynamically selected by the intelligent memory manager from a plurality of types of memory allocation methods that are different from each other, to efficiently handle a set of different memory request size distributions in support of at least one application, the deploying improving at least one of performance and memory utilization of the computing system;
        determining a monetary fee to charge a user based on consumption of memory resources; and
        determining a frequency of backing up a main memory object in a persistent storage based on a bandwidth consumed by storing the main memory object in the persistent storage.

12. The system of claim 11, wherein the method further comprises:
    initializing a plurality of memory allocators within a computing system, wherein at least a first memory allocator and a second memory allocator in the plurality of memory allocators are each customizable to efficiently handle a set of different memory request size distributions;
    configuring the first memory allocator to use a first type of memory allocation method selected by the intelligent memory manager from the plurality of types of memory allocation methods to handle a first memory request size distribution;
    configuring the second memory allocator to use a second type of memory allocation method selected by the intelligent memory manager from the plurality of types of memory allocation methods, the first type being different from the second type, to handle a second memory request size distribution, the second memory request size distribution being different than the first memory request size distribution; and
    deploying at least the first memory allocator and the second memory allocator that have been configured within the computing system in support of at least one application, the deploying improving at least one of performance and memory utilization of the at least one application.

13. The system of claim 11, wherein the method further comprises:
    storing a plurality of memory objects by at least one memory allocator in the plurality of memory allocators;
    determining that the plurality of memory objects that have been stored are no longer required; and
    de-allocating, in response to the determining, memory corresponding to the memory allocator.

14. The system of claim 11, wherein the method further comprises:
  backing up a main memory object in a persistent storage.

15. The system of claim 14, wherein the backing up is performed after a value associated with the main memory object has changed.

16. The system of claim 14, wherein the backing up is performed in response to determining that a version of the main memory object stored within the persistent storage has been obsolete for a time period exceeding a threshold.

17. The system of claim 14, wherein the backing up is performed in response to a number of updates to the main memory object since a most recent version of the main memory object was stored in the persistent storage exceeding a given threshold.

18. A computer readable storage medium, comprising computer instructions which, responsive to being executed by a processor cause the processor to perform operations, the processor being in an information processing system comprised of a memory communicatively coupled with the processor, and an intelligent memory manager comprising a plurality of memory allocators, and wherein the processor, responsive to executing the computer instructions, performs operations comprising:
  deploying the plurality of memory allocators each customizable with a respective type of memory allocation method dynamically selected by the intelligent memory manager from a plurality of types of memory allocation methods that are different from each other, to efficiently handle a set of different memory request size distributions in support of at least one application, the deploying improving at least one of performance and memory utilization of the computing system;
  determining a monetary fee to charge a user based on consumption of memory resources; and
  determining a frequency of backing up a main memory object in a persistent storage based on a bandwidth consumed by storing the main memory object in the persistent storage.

19. The computer readable storage medium of claim 17, wherein the processor, responsive to executing the computer instructions, performs operations comprising:
  initializing the plurality of memory allocators within the information processing system, wherein at least a first memory allocator and a second memory allocator in the plurality of memory allocators are each customizable to efficiently handle a set of different memory request size distributions;
  configuring the first memory allocator to use a first type of memory allocation method selected by the intelligent memory manager from the plurality of types of memory allocation methods to handle a first memory request size distribution;
  configuring the second memory allocator to use a second type of memory allocation method selected by the intelligent memory manager from the plurality of types of memory allocation methods, the first type being different from the second type, to handle a second memory request size distribution, the second memory request size distribution being different than the first memory request size distribution; and
  deploying at least the first memory allocator and the second memory allocator that have been configured within the computing system in support of at least one application, the deploying improving at least one of performance and memory utilization of the at least one application.

20. The computer readable storage medium of claim 17, wherein the processor, responsive to executing the computer instructions, performs operations comprising:
  storing a plurality of memory objects by at least one memory allocator in the plurality of memory allocators;
  determining that the plurality of memory objects that have been stored are no longer required; and
  de-allocating, in response to the determining, memory corresponding to the memory allocator.

* * * * *